(12) United States Patent  
Ikeuchi (10) Patent No.: US 8,591,438 B2  
(45) Date of Patent: Nov. 26, 2013

(54) WALK ASSISTING DEVICE WHICH DEFINES A RIGIDITY OF PORTIONS THEREOF

(75) Inventor: Yasushi Ikeuchi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 189 days.

(21) Appl. No.: 13/127,877

(22) PCT Filed: Nov. 4, 2009

(86) PCT No.: PCT/JP2009/068814  
§ 371 (c)(1),  
(2), (4) Date: May 5, 2011

(87) PCT Pub. No.: WO2010/053086  
PCT Pub. Date: May 14, 2010

(65) Prior Publication Data  
US 2011/0224586 A1    Sep. 15, 2011

(30) Foreign Application Priority Data

Nov. 6, 2008  (JP) ................................. 2008-285947

(51) Int. Cl.  
*A61H 1/00*    (2006.01)

(52) U.S. Cl.  
USPC .................................. 601/35; 601/33; 601/34

(58) Field of Classification Search  
USPC .................. 601/5, 23–24, 26, 33, 34, 35, 84, 601/97–98; 602/5, 16, 19, 23, 24, 25, 26  
See application file for complete search history.

(56) References Cited

U.S. PATENT DOCUMENTS

| | | | | |
|---|---|---|---|---|
| 5,343,397 A | * | 8/1994 | Yoshino et al. | 701/23 |
| 5,432,417 A | * | 7/1995 | Takenaka et al. | 318/568.12 |
| 5,627,440 A | * | 5/1997 | Yamamoto et al. | 318/568.21 |
| 5,637,969 A | * | 6/1997 | Kato et al. | 318/432 |
| 6,243,623 B1 | * | 6/2001 | Takenaka et al. | 700/245 |
| 2005/0209535 A1 | * | 9/2005 | Dariush | 600/595 |
| 2005/0209536 A1 | * | 9/2005 | Dariush | 600/595 |
| 2006/0270950 A1 | * | 11/2006 | Dariush | 601/5 |
| 2006/0270951 A1 | * | 11/2006 | Ikeuchi | 601/5 |
| 2007/0016329 A1 | * | 1/2007 | Herr et al. | 700/250 |
| 2007/0123997 A1 | * | 5/2007 | Herr et al. | 623/27 |
| 2008/0039756 A1 | * | 2/2008 | Thorsteinsson et al. | 602/23 |
| 2008/0114272 A1 | * | 5/2008 | Herr et al. | 600/595 |
| 2008/0154165 A1 | * | 6/2008 | Ashihara et al. | 602/23 |
| 2009/0199883 A1 | * | 8/2009 | Hiki | 135/65 |

FOREIGN PATENT DOCUMENTS

| | | |
|---|---|---|
| EP | 0066028 | 12/1982 |
| JP | 2006-087533 | 4/2006 |

(Continued)

*Primary Examiner* — Clinton T Ostrup  
*Assistant Examiner* — Christopher Miller  
(74) *Attorney, Agent, or Firm* — Rankin, Hill & Clark LLP (57) ABSTRACT

In the walking assist device, defining rigidity of a portion from the user to a first joint as K1 [N/m], rigidity of a portion from the first joint to the second joint as K2 [N/m] and rigidity of a portion from the second joint to one of the feet of a free leg of the user as K31 [N/m], when the user is supported by the support member, they are set as: (K1 +K31)<K2. With this, the assist force can avoid being affected by, in the direction of gravity, vertical displacement of a portion other than the main body of the device and the control accuracy of the assist force is enhanced accordingly, thereby improving the assisting feel sensed by the user P.

9 Claims, 6 Drawing Sheets

(56) References Cited

FOREIGN PATENT DOCUMENTS

| JP | 2006-187348 | 7/2006 |
| JP | 2007-020909 | 2/2007 |
| JP | 2007-029113 | 2/2007 |
| JP | 2008-017981 | 1/2008 |

* cited by examiner

WALK ASSISTING DEVICE WHICH DEFINES A RIGIDITY OF PORTIONS THEREOF

TECHNICAL FIELD

This invention relates to a walking assist device, more particularly to determination of rigidity of portions of the device that can be attached to the lower body of a user to assist his/her walk.

BACKGROUND ART

Recently known walking assist devices for assisting user's walk include, for instance, the one according to the technology set out in Patent Reference 1 below.

The walking assist device of the Patent Reference 1 is equipped with a support member capable of supporting the user, shoe units capable of accommodating the user's feet, and leg links connected to the support member through first joints and also connected to the shoe units through second joints, and configured to produce assist forces that assist or bear at least part of the user's weight, thereby assisting the user's walk.

PRIOR ART REFERENCE

Patent Reference

Patent Reference 1: Japanese Laid-Open Patent Application 2007-20909

SUMMARY OF INVENTION

Problems to be Solved by the Invention

In the walking assist device of the Patent Reference 1, owing to the configuration as above, it can assist the user's walk. However, since it is not clear how to determine the rigidity of each member of the device, there is still room for improvement in terms of an assisting feel sensed by the user.

The object of this invention is therefore to overcome this problem by providing an walking assist device that can produce assist forces which assist at least part of the user's weight through leg links, whose rigidity of each member of the device is appropriately determined, thereby improving the assisting feel sensed by the user.

Means for Solving the Problems

In order to achieve the object, this invention is configured to have a walking assist device having a support member adapted to support a user, a pair of shoe units adapted to accommodate feet of the user and a pair of leg links each connected to the support member through a first joint and connected to each of the shoe units through a second joint, for producing an assist force that assists at least part of weight of the user to assist walking of the user, characterized in that: defining rigidity of a portion from the user to the first joint as $K1$ [N/m], rigidity of a portion from the first joint to the second joint as $K2$ [N/m] and rigidity of a portion from the second joint to one of the feet of a free leg of the user as $K31$ [N/m], when the user is supported by the support member, they are set as: $(K1+K31)<K2$.

According to another aspect, a ratio of a sum of the rigidity $K1$ and the rigidity $K31$ to the rigidity $K2$ is defined as 1:2 or thereabout.

According to another aspect, this invention is configured to have a walking assist device having a support member adapted to support a user, a pair of shoe units adapted to accommodate feet of the user and a pair of leg links each connected to the support member through a first joint and connected to each of the shoe units through a second joint, for producing an assist force that assists at least part of weight of the user to assist walking of the user, characterized in that: defining rigidity of a portion from the user to the first joint as $K1$ [N/m] and rigidity of a portion from the second joint to floor as $K32$ [N/m], when the user is supported by the support member, they are set as: $K1<K32$.

Effects of the Invention

The walking assist device is configured to have a support member adapted to support a user, a pair of shoe units adapted to accommodate feet of the user and a pair of leg links each connected to the support member through a first joint and connected to each of the shoe units (12) through a second joint, for producing an assist force that assists at least part of weight of the user to assist walking of the user, characterized in that: defining rigidity of a portion from the user to the first joint as $K1$ [N/m], rigidity of a portion from the first joint to the second joint as $K2$ [N/m] and rigidity of a portion from the second joint to one of the feet of a free leg of the user as $K31$ [N/m], when the user is supported by the support member, they are set as: $(K1+K31)<K2$. With this, the assist force can avoid being affected by up-down displacement in the direction of gravity of a portion other than the first joint to the second joint, i.e., a portion other than a main body of the device and the control accuracy of the assist force is enhanced accordingly, thereby improving the assisting feel sensed by the user.

In the walking assist device a ratio of the sum of the rigidities $K1$ and $K31$ to the rigidity $K2$ is defined as 1:2 or thereabout. With this, the assist force can avoid being affected by displacement of a portion other than the main body of the device.

The walking assist device is configured to have a walking assist device having a support member adapted to support a user, a pair of shoe units adapted to accommodate feet of the user and a pair of leg links each connected to the support member through a first joint and connected to each of the shoe units through a second joint, for producing an assist force that assists at least part of weight of the user to assist walking of the user, characterized in that: defining rigidity of a portion from the user to the first joint as $K1$ [N/m] and rigidity of a portion from the second joint to floor as $K32$ [N/m], when the user is supported by the support member, they are set as: $K1<K32$. With this, it becomes possible to improve the assisting feel sensed by the user. Specifically, although the load acting on the foot side (shoe unit side) varies more greatly than the load acting on the support member 10, since it is configured so that they are set as $K1<K32$, i.e., configured so that, in the direction of gravity, the lower side containing the foot which contacts the floor is higher in rigidity (harder) than the upper side, it becomes possible to diminish up-down vibration of the device in the direction of gravity, thereby improving the assisting feel sensed by the user. Further, since the up-down vibration of the device in the direction of gravity can be diminished, when the user steps feet in one place for example, it becomes possible to prevent the device from vibrating up and down in the direction of gravity.

DESCRIPTION OF EMBODIMENT

An embodiment for carrying out a walking assist device according to the present invention will now be explained with reference to the attached drawings.

Embodiment

Figure 1:
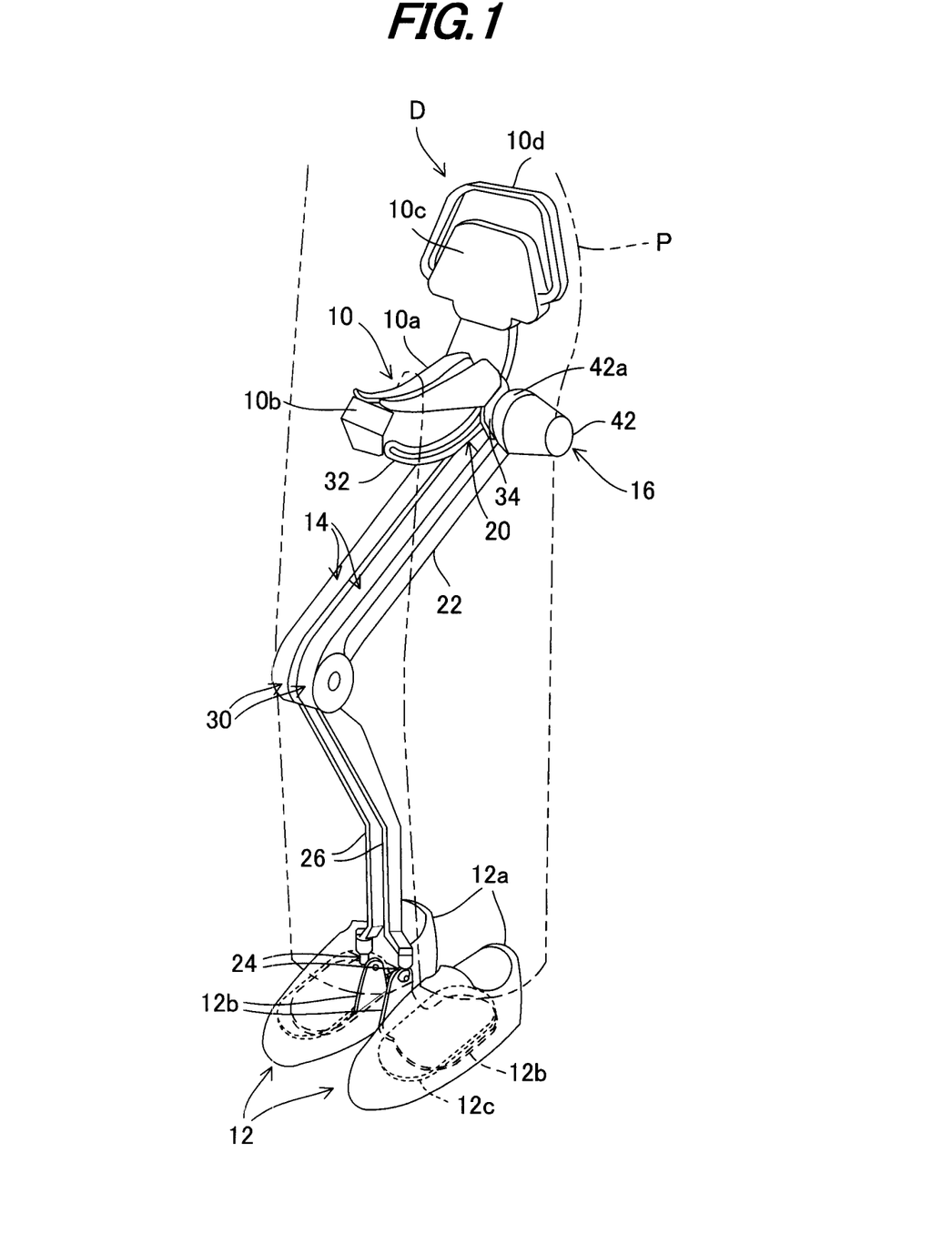
FIG. 1 is a perspective view of a walking assist device according to an embodiment of the invention.
Figure 2:
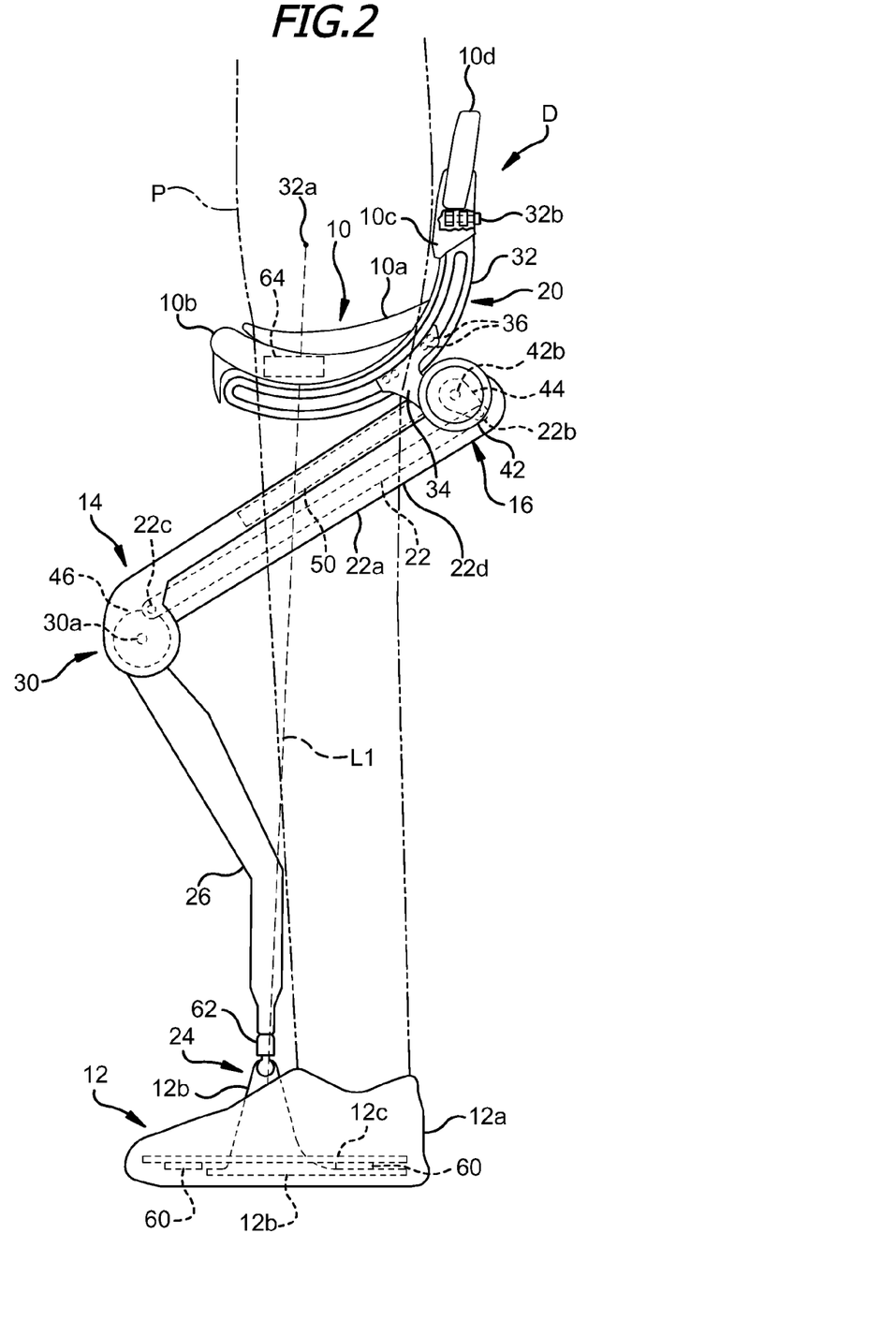
FIG. 2 is a side view of the device shown in FIG. 1.
Figure 3:
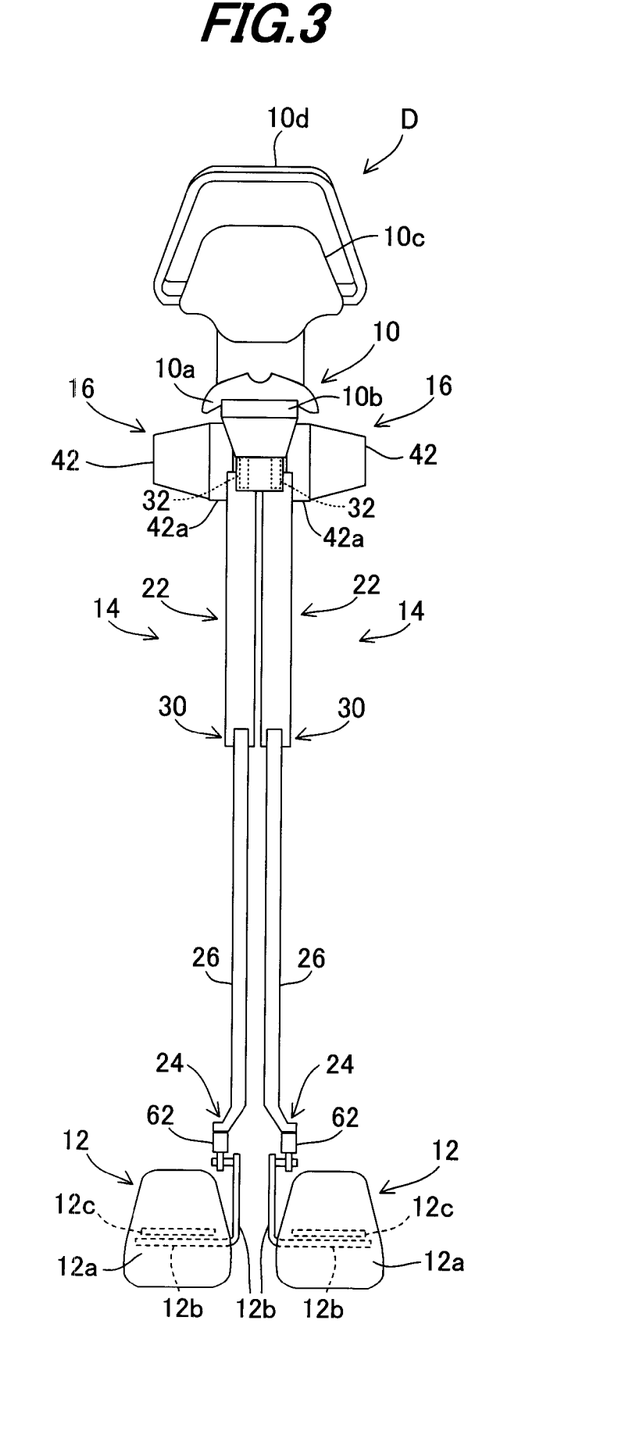
FIG. 3 is a front view of the device shown in FIG. 1.

FIG. 1 is a perspective view of a walking assist device according to an embodiment of the invention, FIG. 2 is a side view thereof and FIG. 3 is a front view thereof.

The explanation will be made with reference to FIGS. 1 to 3. The walking assist device D comprises a support member 10 that is adapted to be fastened to a user P to support the user P seated astraddle thereon, a pair of left and right shoe units 12 to be worn on the left and right feet of the user, a pair of left and right leg links 14 provided between the support member 10 and the shoe units 12, and drive mechanisms 16. The walking assist device D is fastened to the lower body of the user P by a belt (not shown) provided on the support member 10 to assist the user P's walk.

The left and right leg links 14 are made of aluminum. Each comprises a first link (thigh link) 22 connected to the support member 10 through a first joint 20 (corresponding to the human hip joint), a second link (shank link) 26 connected to the associated shoe unit 12 through a second joint 24 (corresponding to the human ankle joint), and a third joint 30 (corresponding to the human knee) connecting the first link 22 and second link 26.

The first link 22 and second link 26 of the leg link 14 are connected to the associated drive mechanism 16 which moves (drives) them relative to each other with the third joint 30 as a pivot point (i.e., about the third joint 30).

The support member 10 comprises a saddle-type seat 10a on which the user P can be seated astraddle, a support frame 10b located near the seat 10a to support it, and a back rest 10c rising from the support frame 10b to above the rear end (as viewed by the user P) of the seat 10a to contact the lower back of the user P. A grip 10d that can be grasped by the user P is attached to the back rest 10c.

As best shown in FIG. 2, the support frame 10b of the support member 10 is forward-canted overall (in the direction of forward movement when the device D is fastened to the user P). The seat 10a is made of a cushioning material, and the support frame 10b and back rest 10c are made of materials of higher rigidity than the seat 10a.

The first joints 20 connecting the leg links 14 and support member 10 each comprises an arc-shaped guide rail 32 fastened to the support member 10 and a slider 34 that engages with the guide rail 32 and is fixed to one end of the associated leg link 14. The guide rails 32 and sliders 34 are made of aluminum.

A plurality of rollers 36 are attached to each slider 34. The rollers 36 are fitted in a groove formed in the guide rail 32 to roll along the groove. Therefore, as shown in FIG. 2, each slider 34 engages with the associated guide rail 32 to be movable along it.

In other words, each leg link 14 is configured such that it can swing about the center of curvature 32a (swing pivot point) of the associated guide rail 32 in the longitudinal direction of the support member 10. Moreover, the guide rails 32 are pivotally supported on the back rest 10c of the support member 10 by a support shaft 32b installed to extend in the longitudinal direction of the support member 10, thereby enabling the guide rails 32 to swing about the support shaft 32b in the lateral direction of the support member 10.

Thus the leg links 14 are configured such that they can swing forward and backward (in the traveling direction of the user P) about the centers of curvature 32a of the guide rails 32 as the swing pivot points, so that when the point of action of the upper body weight of the user P relative to the support member 10 shifts forward of the swing pivot points 32a to make the support member 10 descend forward, since the swing pivot points 32a are located above the support member 10 in the direction of gravity, the point of action of the body weight is displaced rearward below the swing pivot point 32a, thereby shortening the fore-aft distance between the swing pivot point 32a and the point of action of the body weight to reduce rotational moment acting on the support member 10.

Next, when the point of action of the body weight has moved as far as directly under the swing pivot point 32a, the rotational moment acting on the support member 10 becomes zero and the support member 10 becomes stable. Thus, the support member 10 converges on the stable state by itself, so that the support member 10 does not shift forward or backward at the location of the user P's crotch.

The guide rails 32 are enabled to swing sideways (relative to the traveling direction of the user P) about the support shaft 32b, so that the leg links 14 can swing sideways to make it possible for the user P to swing the legs outward at will.

Each of the shoe units 12 comprises a shoe 12a to be worn on a foot of the user P, an L-shaped (as viewed from the front looking rearward along the path of user P travel) connecting member 12b made of carbon material and installed in the shoe 12a for enabling the corresponding foot of the user P to rest thereon, and an insole 12c of urethane rubber or similar rubbery elastic material that lies on the upper surface of the connecting member 12b. The second link 26 of each leg link 14 is connected to the associated connecting member 12b through the associated second joint 24 of triaxial structure.

Figure 4:
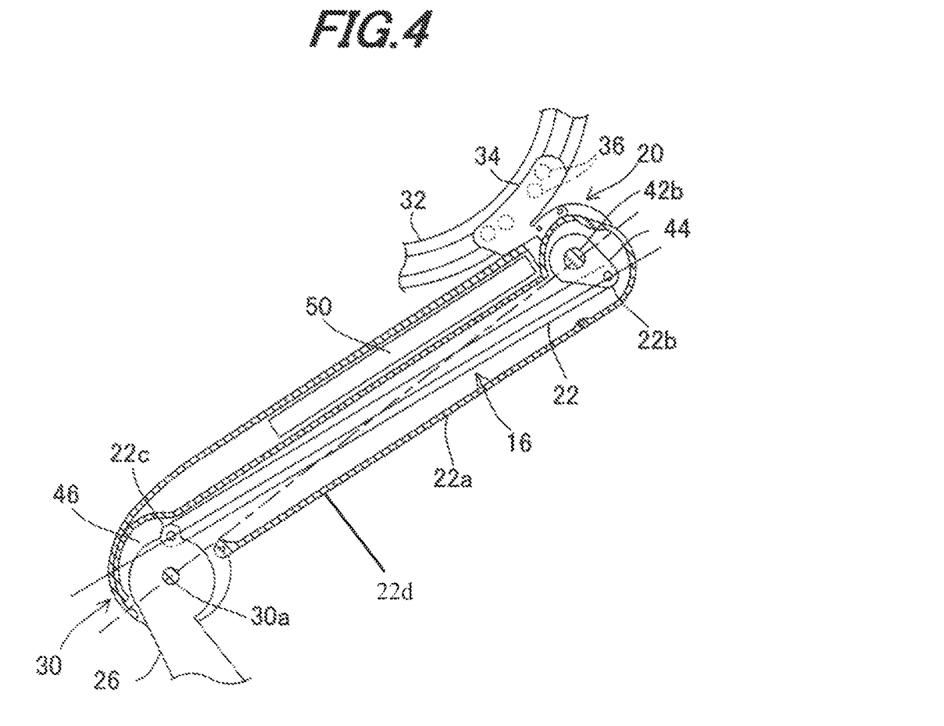
FIG. 4 is a side sectional view of a drive mechanism, first link and other components shown in FIG. 1, etc.

FIG. 4 is a side sectional view of the drive mechanisms 16 and the associated first link 22, etc.

The drive mechanism 16 comprises an actuator (electric motor) 42 located near an end of the first link 22, an output shaft 42b outputting the rotation of the actuator 42 through a speed reducer 42a, a drive crank arm 44 fastened to the output shaft 42b, and a driven crank arm 46 fastened to the second link 26 coaxially with a joint shaft 30a of the third joint 30.

The drive crank arm 44 and the driven crank arm 46 are interconnected by the first link 22. Specifically, the first link 22 is connected by a connecting rod 22a pivotally attached at one end to the drive crank arm 44 by first a pivot 22b and at the other end to the driven crank arm 46 by a second pivot 22c, thereby establishing rotatable connections. Thus, more specifically, the first link 22 is constituted as a quadric chain comprising the first link 22, the drive crank arm 44, the connecting rod 22a and the driven crank arm 46.

As shown in FIG. 4, the first link 22 is disposed so that a line drawn to connect its first pivot 22b on the drive crank arm 44 with its second pivot 22c on the driven crank arm 46 intersects a line drawn to connect the output shaft 42b of the actuator 42 with the joint shaft 30a of the third joint 30. A battery 50 housed in a cover 22d of the first link 22 supplies power for operating the actuator 42 and the like.

The walking assist control for assisting the user P's walk will be explained next. Note that the user P generates the gait by repeating a free leg period (i.e., a one-leg supporting period during which one of the two legs is in contact with the floor and the other thereof is the free leg) and a stand period (i.e., a two-leg supporting period during which the both legs are in contact with the floor).

Each shoe unit 12 is provided on the undersurface of its insole 12c with a pair of front and rear single-axis force sensors 60 that produce outputs proportional to the loads acting at the middle toe (MP (metacarpophalangeal) joint) region and heel region of the user P's foot. In addition, each second joint 24 incorporates a biaxial force sensor 62 that produces an output proportional to the force acting on the second joint 24 (resultant of the forces produced by the weights of the support member 10 and the associated leg link 14).

The outputs of the sensors 60 and 62 are sent to a controller 64 housed in the support frame 10b of the support member 10. The controller 64 comprises a microcomputer equipped with a CPU, ROM, RAM and input-output (I/O) ports, and executes assist control for producing assist forces that assist the user P's walk.

More specifically, the controller 64 multiplies the value of the assist forces set in advance by a proportion of the total load acting on the feet of the user P that is borne by the individual feet calculated from the outputs of the force sensors 60, and defines the obtained products as the desired values of the assist forces to be produced in the respective leg links 14. For example, where the load (weight) of the device D is 60 (N) and the assist force is 30 (N), the set value will be 90 (N).

Each assist force acts along the line in FIG. 2 (designated L1; hereinafter sometimes called "reference line") that interconnects the fore-aft swing pivot point 32a of the leg link 14 in the first joint 20 and the fore-aft swing pivot point of the leg link 14 in the second joint 24. So the controller 64 detects the actual assist force acting along the reference line L1 based on the output of the force sensor 62 and controls the operation of drive mechanisms 16, more precisely the current supply to the actuator 42, to make the detected actual assist force equal to the desired value through the feedback control such as the proportional-derivative (PD) control.

More specifically, as will later be shown in FIG. 6, when the user P is supported as seated on the seat 10a of the support member 10, the controller 64 operates the actuators 42 of the drive mechanisms 16 to produce relative movement between the first links 22 and the second links 26 of the leg links 14 about the joint shafts 30a of the third joints 30, thereby helping the user P walk by producing supporting forces, i.e., assist forces, to support at least part of the user P's body weight.

The assist forces produced in the leg links 14 are transmitted through the support member 10 to the trunk of the user P to assist his/her walking by reducing the load acting on the legs of the user P. The user P is presumed to be a worker at a factory or the like who works in a standing posture.

The walking assist device D according to this embodiment is characterized in that the rigidity of each member of the device D is appropriately determined, thereby improving the assisting feel sensed by the user.

Figure 5A:
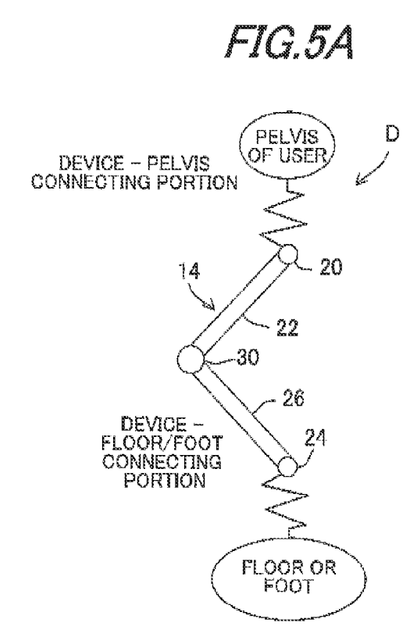
FIG. 5A is a simplified explanatory view showing the device shown in FIG. 1, etc.
Figure 5B:
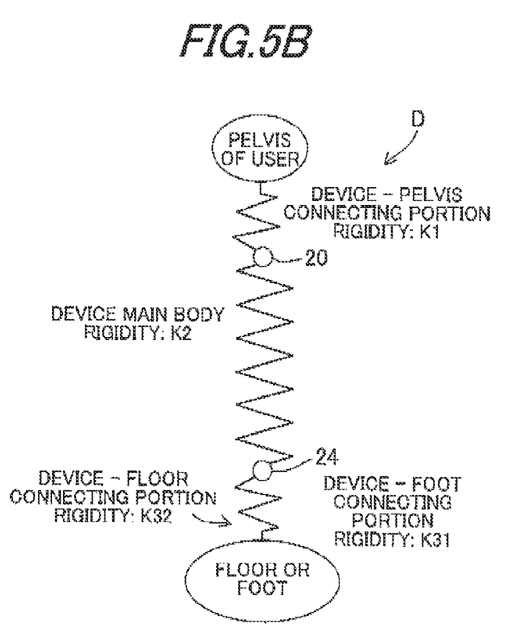
FIG. 5B is further simplified explanatory view.

Explaining this, FIG. 5A is a simplified explanatory view showing the device D shown in FIG. 1, etc., and FIG. 5B is further simplified explanatory view. FIG. 6 is a block diagram showing the aforementioned assist control and FIG. 7 is a simulation data showing a response of the assist force with respect to a step input of displacement of the shoe unit 12, etc.

As shown in FIGS. 5A and 5B, the device D according to this embodiment is configured so that, defining the rigidity of a portion from the user P, precisely the center of gravity of him/hers, to the first joint 20 ("DEVICE-PELVIS CONNECTING PORTION") as K1 [N/m], the rigidity of a portion from the first joint 20 to the second joint 24 ("DIVICE MAIN BODY RIGIDITY") as K2 [N/m] and the rigidity of a portion from the second joint to a foot of the free leg (which is not in contact with the floor) of the user P ("DEVICE-FOOT CONNECTING PORTION") as K31 [N/m], when the user P is supported by (seated on) the support member 10, they are set as: (K1+K31)<K2.

To be more specific, in FIGS. 5A and 5B, the rigidity K1 of a connecting portion between the upper side of the device D and the pelvis represents the rigidity of the seat 10a of the support member 10 and that of the buttocks of the user P (or an average person) or the like. Also, the rigidity K31 or K32 of the portion from the lower side of the device D to the floor or the user P's foot represents the rigidity of the connecting member 12b, insole 12c, user P's foot or the like.

Further, the device D according to this embodiment is configured so that, defining that the rigidity of a portion from the user P, precisely the center of gravity of him/hers, to the first joint 20 as K1 [N/m] and the rigidity of a portion from the second joint 24 to the floor, precisely a portion from the second joint 24 to the floor (or the ground) during the stand period, as K32 [N/m], they are set as: K1<K32.

It should be noted that, as shown in FIGS. 5A and 5B, the rigidity Kn represents a spring constant, i.e., the load [N] acting on a spring and flexure [m] caused thereby. Further, in FIGS. 5A and 5B, since the hardness, (rigidity), etc., of the user P's body around or under the pelvis differs depending on individuals, the average value experimentally obtained is applied.

Figure 6:
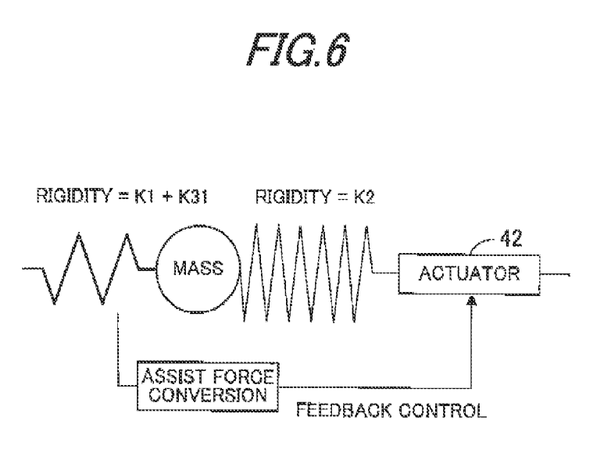
FIG. 6 is a block diagram showing assist control of the device shown in FIG. 1.
Figure 7:
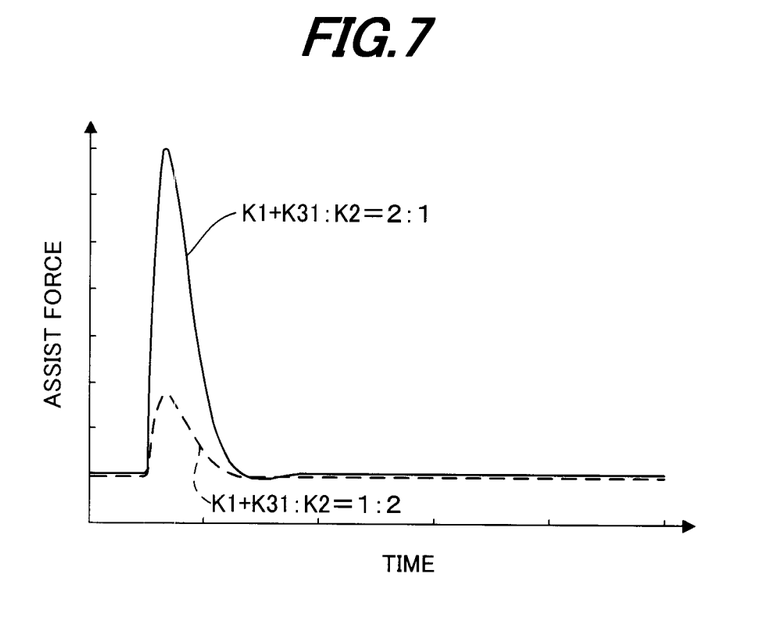
FIG. 7 is a simulation data showing a response of assist force with respect to a step input of displacement of a foot, etc., in the case where the device shown in FIG. 1, etc., is configured in its rigidity as shown in FIGS. 5A and 5B.

Defining that a ratio of a sum (K1+K31) of the rigidities of the upper and lower sides of the device D to the rigidity K2 of a main body of the device D as 1:2 or 2:1 in the configuration shown in FIG. 6, FIG. 7 is a simulation data showing a response of the assist force with respect to a step input of displacement of a portion other than the main body, i.e., the foot or the center of gravity of the user. The assist force indicates a value to be obtained with the configuration in FIG. 6.

As can be seen from the figure, when the ratio of a sum of the rigidities of the upper and lower sides of the device D to the rigidity of the main body thereof is defined as 2:1, the assist force greatly varies. On the other hand, when the ratio is defined as 1:2, the assist force does not greatly vary. Thus, in the case where the ratio is set to 1:2 or thereabout, even when a portion other than the main body, i.e., the foot or the center of gravity of the user P is slightly moved, it hardly affects the assist force and the control accuracy is improved accordingly, thereby improving the assisting feel sensed by the user P.

As stated above, this embodiment is configured to have a walking assist device (D) having a support member (10) adapted to support a user (P), a pair of shoe units (12) adapted to accommodate feet of the user and a pair of leg links (14) each connected to the support member (10) through a first joint (20) and connected to each of the shoe units (12) through a second joint (24), for producing an assist force that assists at least part of weight of the user (P) to assist walking of the user, characterized in that: defining rigidity of a portion from the user (P), more precisely the center of gravity of the user to the first joint (20) (in other words the rigidity of a portion upper than the first joint (20) in the direction of gravity) as K1 [N/m], rigidity of a portion from the first joint (20) to the second joint (24) as K2 [N/m] and rigidity of a portion from the second joint (24) to one of the feet of a free leg of the user (P) (in other words the rigidity of a portion lower than the second joint (24) in the direction of gravity) as K31 [N/m], when the user (P) is supported by the support member (10), they are set as: (K1+K31)<K2. In other words, it is configured such that the rigidity K1+K31 of the upper and lower side portions, i.e., portions near the user P, of the device D in the direction of gravity is made smaller or lower, i.e., softer, than the rigidity K2 of the main body of the device D. With this, the assist force can avoid being affected by displacement of a portion other than the main body of the device D and the control accuracy of the assist force is enhanced accordingly, thereby improving the assisting feel sensed by the user P.

In particular, when a ratio of the sum of the rigidities K1 and K31 to the rigidity K2, i.e., a ratio of the sum of the rigidities K1 and K31 of the upper and lower sides of the device D in the direction of gravity to the rigidity K2 of the main body is defined as 1:2, the assist force can avoid being affected by displacement of a portion other than the main body of the device D.

Further, this embodiment is configured to have a walking assist device (D) having a support member (10) adapted to support a user (P), a pair of shoe units (12) adapted to accommodate feet of the user (P) and a pair of leg links (14) each connected to the support member (10) through a first joint (20) and connected to each of the shoe units (12) through a second joint (24), for producing an assist force that assists at least part of weight of the user (P) to assist walking of the user, characterized in that: defining rigidity of a portion from the user (P), more precisely the center of gravity of the user to the first joint (20) to the first joint as K1 [N/m] and rigidity of a portion from the second joint to floor as K32 [N/m], when the user is supported by the support member, they are set as: K1<K32. With this, it becomes possible to improve the assisting feel sensed by the user P.

Specifically, although the load acting on the foot (shoe 12) side varies more greatly than the load acting on the support member 10, since it is configured so that they are set as K1<K32, i.e., configured so that, in the direction of gravity, the lower side containing the foot which contacts the floor is higher in rigidity than the upper side, it becomes possible to diminish up-down vibration of the device D in the direction of gravity, thereby improving the assisting feel sensed by the user P. Further, since the up-down vibration of the device D in the direction of gravity can be diminished, when the user P steps feet in one place for example, it becomes possible to prevent the device D from vibrating up and down in the direction of gravity.

On the other hand, since the upper side of the device D is lower in rigidity than the lower side thereof in the direction of gravity, it becomes possible to give the soft assisting feel to the user P, thereby further improving the assisting feel.

Although this invention has been explained with reference to an embodiment, this invention is not limited to the embodiment. For example, the support member 10 is not limited to a structure enabling use in a seated posture but can be of a structure using a belt such as taught by Japanese Laid-Open Patent Application No. 2006-187348.

INDUSTRIAL APPLICABILITY

According to this invention, in the walking assist device, defining rigidity of a portion from the user to the first joint as K1 [N/m], rigidity of a portion from the first joint to the second joint as K2 [N/m] and rigidity of a portion from the second joint to one of the feet of a free leg of the user as K31 [N/m], when the user is supported by the support member, they are set as: (K1+K31)<K2. With this, the assist force can avoid being affected by, in the direction of gravity, vertical displacement of a portion other than the main body of the device and the control accuracy of the assist force is enhanced accordingly, thereby improving the assisting feel sensed by the user P.

DESCRIPTION OF SYMBOLS

D Walking assist device, 10 Support member, 10a Seat, 10b Support frame, 10c Back rest, 10d Grip, 12 Shoe unit, 12a Shoe, 12b Connecting member, 12c Insole, 14 Leg link, 16 Drive mechanism, 20 First joint, 22 First link, 24 Second joint, 26 Second link, 30 Third joint, 32 Guide rail, 32a Center of curvature (swing pivot point), 32b Support shaft (swing pivot point), 34 Slider, 36 Roller, 42 Actuator, 42a Speed reducer, 42b Output shaft, 44 Drive crank arm, 46 Driven crank arm, 50 Battery 60, 62 Force sensor, 64 Controller

The invention claimed is:

1. A walking assist device having a support member adapted to support a user, a pair of shoe units adapted to accommodate feet of the user and a pair of leg links each connected to the support member through a respective first joint and the pair of leg links each connected to a respective one of the pair of shoe units through a respective second joint, for producing an assist force that assists at least part of a weight of the user to assist walking of the user,
wherein:
a first rigidity K1 [N/M] is a rigidity of a portion above the first joint, in the direction of gravity, a second rigidity K2 [N/m] is the rigidity of a portion between one of the first joints and the respective second joints, and a third rigidity K31 [N/m] is the rigidity of a portion lower than the second joint, in the direction of gravity;
rigidity represents a spring constant; and
the support member, the pair of shoe units, the pair of leg links, the first joints, and the second joints are configured such that a relationship between the first rigidity, the second rigidity, and the third rigidity is: (K1+K31)<K2.

2. The device according to claim 1, wherein the support member, the pair of shoe units, the pair of leg links, the first joints, and the second joints are formed such that a ratio of a sum of the first rigidity K1 and the third rigidity K31 to the second rigidity K2 is 1:2 .

3. The device according to claim 1, wherein each of the pair of leg links comprises a first link connected to the support member through the first joint, a second link connected to the shoe unit through the second joint, and a third joint connecting the first link and the second link, and
the support member, the pair of shoe units, the pair of leg links, the first joints, the second joints, and the third joints are formed such that a relationship between the first rigidity, the second rigidity, and the third rigidity is: (K1+K31)<K2.

4. The device according to claim 3, wherein the first link and the second link of each of the pair of leg links are connected to a drive mechanism which moves the first link and the second link relative to each other with the third joint as a pivot point.

5. The device according to claim 1, wherein the support member comprises a saddle seat adapted for the user to be seated astraddle.

6. A walking assist device having a support member adapted to support a user, a pair of shoe units adapted to accommodate feet of the user and a pair of leg links each connected to the support member through a respective first joint and the pair of leg links each connected to a respective one of the pair of shoe units through a respective second joint, for producing an assist force that assists at least part of a weight of the user to assist walking of the user, wherein:

a first rigidity $K1$ [N/M] is a rigidity of a portion above the first joint, in the direction of gravity, and a second rigidity $K32$ [N/m] is a rigidity of a portion between the second joints and a floor;

rigidity represents a spring constant; and the support member and the pair of shoe units are configured such that a relationship between the first rigidity and the second rigidity is: $K1 < K32$.

7. The device according to claim 6, wherein each of the pair of leg links comprises a first link connected to the support member through the first joint, a second link connected to the shoe unit through the second joint, and a third joint connecting the first link and second link.

8. The device according to claim 7, wherein the first link and second link of each of the pair of leg links are connected to a drive mechanism which moves the first link and second link relative to each other with the third joint as a pivot point.

9. The device according to claim 6, wherein the support member comprises a saddle seat adapted for the user to be seated astraddle.

\* \* \* \* \*